United States Patent

[11] 3,558,004

[72] Inventors: Harry S. Boyd, Jr.
Norman;
David M. Boyd, 1214 Barkley Ave.,
Norman, Okla. 73069
[21] Appl. No. 808,187
[22] Filed Mar. 18, 1969
[45] Patented Jan. 26, 1971

[54] ARTICLE DISPENSING APPARATUS WITH AUTOMATIC DRIBBLE FEED
19 Claims, 9 Drawing Figs.
[52] U.S. Cl. .................................................. 221/7,
133/8, 198/40, 198/220; 221/13
[51] Int. Cl. ...................................................... G07f 11/00
[50] Field of Search .......................................... 133/1, 8;
221/2, 3, 7, 13; 198/40, 220

[56] References Cited
UNITED STATES PATENTS
1,238,736  9/1917  Barrett .......................... 133/1
2,632,588  3/1953  Hoar, Jr. ........................ 221/7X
3,455,436  7/1969  Berke ............................. 198/40

Primary Examiner—Samuel F. Coleman
Attorney—Dunlap, Laney, Hessin & Dougherty

ABSTRACT: Apparatus for dispensing a predetermined number of small, solid, objects, such as pills, including a hopper having a grooved spout extending from one side of the hopper, a vibrating device for vibrating the hopper to move the objects through the spout, a concussion or impact-type detector positioned in the path of the objects so that the objects consecutively impinge on the detector, and a counter connected to the detector for counting the objects consecutively impinging on the counter. The groove in the spout is sinuous and inclined to assure that a plurality of the objects will not be discharged from the spout simultaneously, and the hopper is mounted in a vibrating bed. The detector is electrically connected to the counter through a sensitive microphonic amplification system which permits relatively high speed detection and counting.

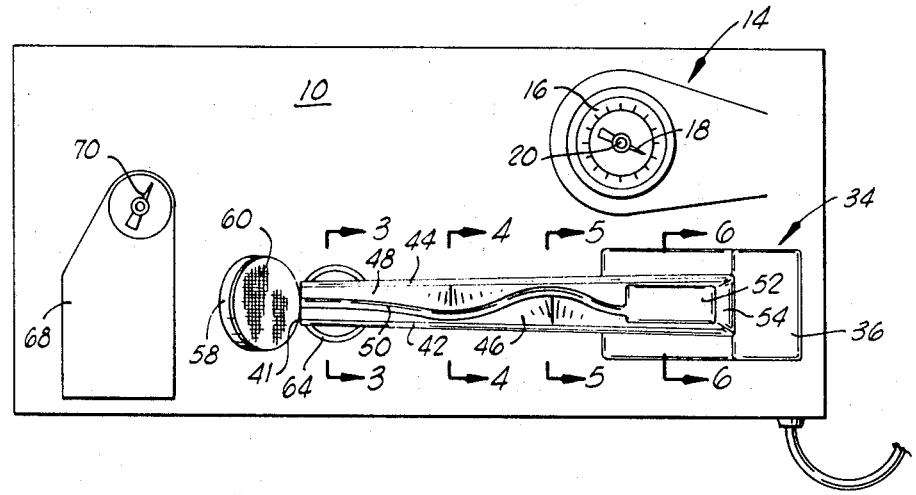
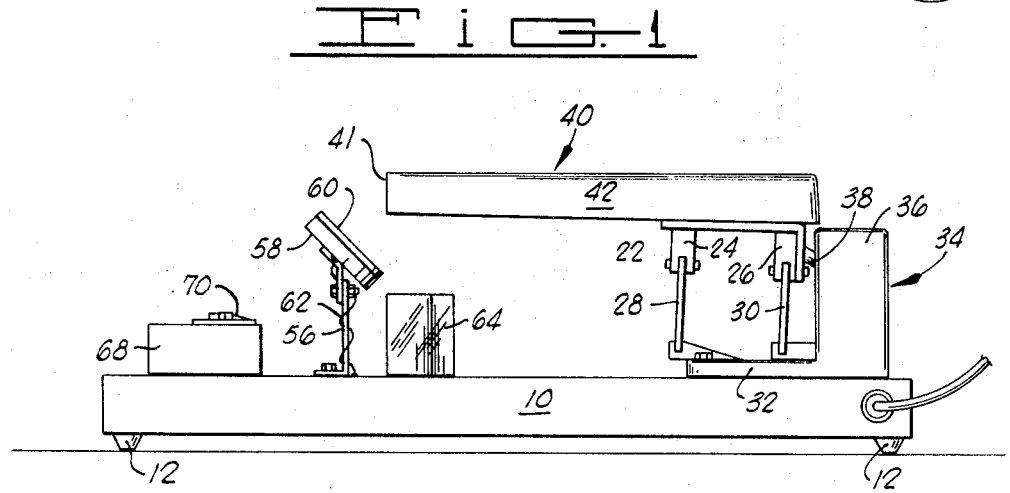
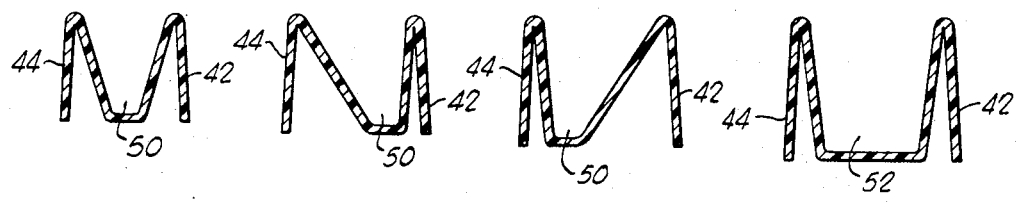

ARTICLE DISPENSING APPARATUS WITH AUTOMATIC DRIBBLE FEED

BACKGROUND OF THE INVENTION

1. Field of the Invention

This invention relates to apparatus for counting out and dispensing an exact predetermined number of small, solid objects. More particularly, but not by way of limitation, the invention relates to apparatus for accurately counting out pills for such purposes as prescription filling and the like.

2. Brief Description of the Prior Art

A number of devices are disclosed in the patent literature which are alleged to function effectively in automatically counting out a predetermined number of small, solid objects, such as nuts, screws, pills, and tablets. The need for devices of this type is felt in many industries, and in a number of instances, the machines are successfully employed. The specific characteristics of the objects being counted out differ from field to field, however, as do the requirements of counting speed, cost of the apparatus, and precision of count. Thus, for example, it is not surprising that in the case of the latter criterion, i.e., precision of count, a counting apparatus which may be accurate to the extend of ± five articles in a total delivered number of 500 of such articles, may be entirely adequate for counting nails or screws, but too imprecise for the purpose of counting watch jewels, expensive drugs in the form of pills, and other such costly articles.

To our knowledge, a relatively inexpensive, compact, easily used and completely automatic apparatus has not yet been devised which will efficiently and accurately dispense a predetermined number of pills or tablets to a bottle or other container in the manner which is presently accomplished manually by pharmacists in filling prescriptions. Such dispensation is presently accomplished by merely placing a number of the pills in a receptacle having a funnel or spout like discharge chute, visually and manually separating the surplus of pills from the number prescribed, and then manually dumping the prescribed number of pills through the discharge chute into the pill bottle. This procedure is time consuming and, in view of the considerable time delays often experienced by patients in getting prescriptions filled, can hardly be justified if any reliable and relatively inexpensive apparatus for automating the procedure now exists.

The apparatuses heretofore proposed for automatically counting out predetermined numbers of pills have failed to find widespread usage by pharmacists for several reasons. Many are complicated and expensive in construction, thus requiring a high initial capital investment, and requiring a fairly high level of skill and dexterity in their successful use. Others include detection and counting components which are not sufficiently sensitive or accurate to merit any confidence in their performance, or which, in the same vein, count accurately only at relatively slow rates of dispensation, and thus do little to assist the pharmacist in reducing his backlog of prescriptions to be filled unless he is prepared to accept counting inaccuracies at the higher speeds of dispensation. In yet other types of apparatus which have been proposed but not widely used for this purpose, inaccuracies result, not from the detection and counting elements of the system, but from the inability of the apparatus to deliver individual pills in consecutive, isolated sequence to the zone in which they are detected.

Examples of some of the prior patented proposals for counting out a number of pills are those which are disclosed in U.S. Pat. No. 2,544,894 to Nelson and U.S. Pat. No. 2,632,588 to Hoar.

BRIEF DESCRIPTION OF THE PRESENT INVENTION

The present invention provides an improved automatically counting dispensing apparatus which will accurately count out a predetermined number of small objects, such as pills or tablets, at a high rate of speed with no abnormal skill required by the part of the operator of the apparatus. Broadly described, the invention comprises a hopper for containing the objects, means for vibrating the hopper, a sinuously grooved chute extending outwardly from the hopper, an impact type detector positioned opposite the open end of the chute, and a counter connected to the detector for counting each object detected by the detector.

The groove in the chute through which the articles to be counted move from the hopper is an elongated, sinuously curved groove which has undulations formed therein over its length in a geometric pattern such as to apply decreasing frictional resistance to the movement of the articles from the hopper to the discharge end of the chute.

In a preferred embodiment of the invention, the grooved chute is positioned so that the sinuous groove therein is inclined slightly upwardly from the hopper, and the means for vibrating the hopper preferably comprises a solenoid type vibrating apparatus which delivers a relatively slow, oscillating stroke in the direction of movement of the articles to be counted through the groove in the chute. It then delivers a retractive stroke to the chute and the hopper which is relatively rapid in comparison to the forwardly thrusting stroke. It is also preferred to provide a switching arrangement in the electrical circuitry which controls the vibratory frequency of the vibrating device so that the frequency of the vibrations can be decreased automatically at a time when the articles to be counted have been delivered and counted out to within a small number of the total count which is desired. This arrangement at that time decreases the momentum of the individual articles being moved through the chute, and thus enhances the accuracy with which a desired specific number of articles may be delivered from the discharge end of the chute.

An important aspect of the invention is the type of detector employed. It is important that the detector have good sensitivity and good "resolving power" to permit accurate counting at high speeds. Thus, it must be able to individually detect two articles which leave the chute within a small fraction of a second of each other. Photocell-type detectors have been found to be unreliable in this respect. The impact-type detector has been very successfully employed, however, using a microphonic pickup with substantial amplification of the signal.

The automatically counting dispensing apparatus as thus described achieves a major object of the invention, which is to provide a device capable of automatically delivering a precise, predetermined number of small objects to a container in a rapid manner.

Another object achieved by the invention is to provide a pill counting apparatus which can be economically constructed and sold, and can be used with a minimum amount of skill for accurately quantitatively filling many drug prescriptions.

An additional object of the invention is to provide an article counting apparatus which is of mechanically sturdy construction, and is characterized in having a long and trouble-free operating life.

Other objects and advantages of the invention will become apparent as the following detailed description of the invention is read in conjunction with the accompanying drawings.

BRIEF DESCRIPTION OF THE DRAWINGS

FIG. 1 is a plan view of a dispensing and counting apparatus constructed in accordance with the invention.

FIG. 2 is a side elevation view of the dispensing and counting apparatus depicted in FIG. 1.

FIGS. 3—6 are sectional views taken along lines 3—3, 4—4, 5—5 and 6—6, respectively, of FIG. 1.

DETAILED DESCRIPTION OF A PREFERRED EMBODIMENT OF THE INVENTION

Figures 7, 8:
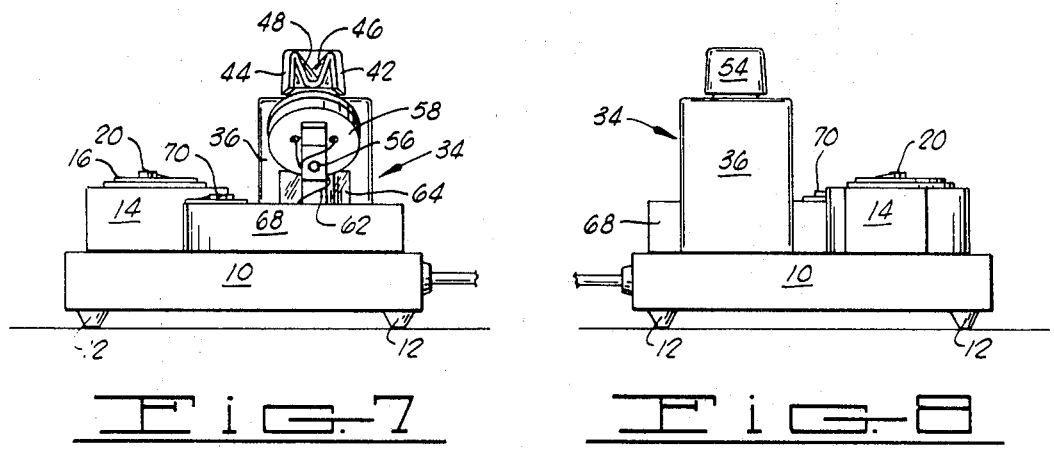
FIG. 7 is an end elevation view of the dispensing and counting apparatus depicted in FIG. 1 as it appears when viewed from the end of the device upon which the counter is mounted and facing toward the chute and hopper.
FIG. 8 is an end elevation view of the dispensing and counting apparatus depicted in FIG. 1 as the apparatus appears when viewed from the opposite end thereof from that which is seen in FIG. 7.

Referring initially to FIGS. 1—4 of the drawings, one embodiment of the dispensing and counting apparatus useful in the practice of the invention is depicted therein. In referring to the drawings, reference numerals having lead lines with arrowheads attached thereto will be used to indicate combinations of a plurality of structural elements contributing to a major unitary function. Plain lead lines will be used to interconnect reference numerals to single or individual elements of structure.

The dispensing and counting apparatus of the invention includes a base unit 10 of generally rectangular configuration which operates as a supporting structure for mounting the mechanical operating elements of the invention, and which carries suitable, preferably resilient supporting legs 12 as depicted in FIGS. 2, 7 and 8. Mounted on the upper side of the base unit 10 is an automatic, presettable subtractive counter 14 which includes a scale 16 having numerical indicia thereon, and a pointer 18 secured to the upper end of a shaft 20 for rotation with the shaft about its longitudinal axis. The counter 14 can be any suitable type of subtractive counter which is capable of being preset to a number and then, as each of a number of objects is sensed and counted and an impulse delivered to the counter, will rotate the pointer, moving to the next lowest number until the counter has counted out to zero, at which time the counting circuit is automatically opened. As will be hereinafter explained, it is desirable to modify such counters in such a way that the associated electrical circuitry is changed after the counter has counted down to a low digit of, say, between two and five, in order to vary the vibrational characteristics of the vibrating device used in the dispensing apparatus of the invention.

Also located on the upper side of the dispensing and counting base unit 10 is a hopper support plate 22 which is secured at its lower side to a pair of downwardly depending brackets 24 and 26. The bracket 24 and 26 are in turn secured to the upper end of a pair of upwardly extending resilient members 28 and 30 which function as springs for a purpose hereinafter described. The lower ends of the resilient members 28 and 30 are suitably anchored to a base plate 32 of a vibrator structure designated generally by reference character 34, and secured to the base unit 10. The vibrator structure 34 includes a housing 36 which encloses a solenoid having an armature 38 projecting therefrom, the solenoid being hereinafter described in greater detail.

Mounted upon the hopper support plate 22 is an elongated hopper assembly designated generally by reference numeral 40. The hopper assembly 40 includes a spout 41 formed by a pair of vertically extending sidewalls 42 and 44 which are secured at their upper edges to downwardly and inwardly extending internal walls. One of these internal walls is designated by reference numeral 46 and the other internal wall is designated by reference numeral 48. As will be perceived in referring to FIGS. 1 and 3—6, the internal walls 46 and 48 are of undulating configuration so that they slope downwardly to, and define, a sinuous groove or channel 50 which is disposed in the bottom of the elongated spout 41. At one end of the groove 50, the groove communicates with a hopper 52. The hopper is closed by an end wall 54. The end of the spout 41 opposite the hopper 51 is open, as is the groove 50 located in the bottom of the spout.

Mounted on the base unit 10 is a detector support post 56 having a head element 58 pivotally connected to the upper end thereof. The head element 58 carries a pressure sensitive or impact-type detector 60 which includes a pressure sensitive diaphragm and other conventional microphonic pickup elements. The pickup elements are connected to an electrical lead 62 which extends down along the support post 56 into the interior of the base unit 10. Positioned adjacent the detector support post 62 in a position to receive articles to be counted as they are deflected by the pressure sensitive diaphragm is a pill vial 64.

It will be noted in referring to FIG. 1 and FIGS. 3—6 that the groove 50 in the bottom of the chute or spout 41 is characterized in having a particular configuration which is an important aspect of the present invention. Thus, the groove 50 is sinuous, and it will be noted in referring to FIG. 1 that the curved path through which the groove extends becomes less tortuous or curved at points progressively further removed along the groove from the hopper 52. The purpose of this will be hereinafter explained. It should also be pointed out that in a preferred embodiment of the invention, the groove 50 is made to extend upwardly with respect to the horizontal as it progresses from the hopper 52 outwardly toward the open end of the spout 41. Thus, articles moving through the groove 50 from the hopper 52 are traveling "uphill" at a very slight angle.

An amplifier housing 68 is supported on the base 10 and encloses, among other components hereinafter described, a potentiometer (not seen) whose movable tap is connected to a control pointer 70 which permits manual adjustment of the sensitivity of the detector 60.

Figure 9:
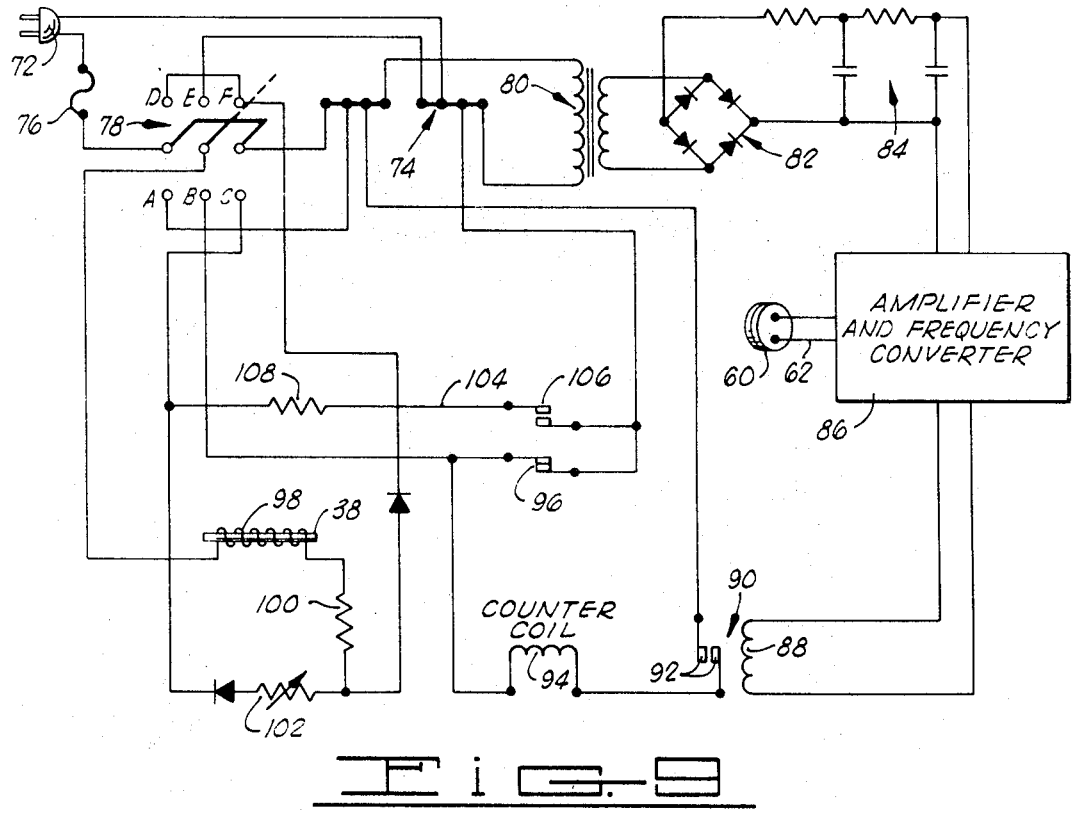
FIG. 9 is an electrical circuit diagram of the electrical circuitry utilized in the dispensing and counting apparatus of the invention.

The electrical circuitry utilized in the dispensing apparatus of the invention is depicted in FIG. 9 of the drawings. A plug 72 is provided for connecting the apparatus to a suitable source of alternating current, and one lead from the plug 72 is connected to a terminal board 74. The other lead is connected through a fuse 76 to one terminal of a three-pole double-throw switch designated generally by reference numeral 78. The poles of the switch 78 are labeled A, B, C, D, E and F in the drawing. The alternating current from the power source is passed, in the proper position of the switch 78, through a transformer 80 where it is stepped down to the required voltage and then is converted to direct current by a full wave rectifier 82. The direct current is passed through a filter system 84 to an amplifier and frequency converter 86 which amplifies signals received from the microphonic pickup 60 and converts them into a usable frequency.

The amplifier and frequency converter 86 passes the amplified signals, after conversion to a suitable frequency, to the coil 88 of a relay designated generally by reference numeral 90. The normally open contacts 92 of the relay 90 are connected in a circuit receiving alternative current from the AC power source via the three-pole double-throw switch 78. The circuit which contains the normally open contacts 92 also contains a coil 94 which forms a part of the subtracting counter 14, many suitable types of which are available. The subtracting counter 14 operates by initially having a numerical count manually set thereinto, and this count is then counted out with one count being consecutively subtracted upon each energization of the coil 94 until a zero reading is reached. The operation of subtracting counters of this type is well understood by those skilled in the art. At the time that the subtracting counter reaches the zero reading, the mechanical wheels of the counter carry a stud or projection which, in moving to the zero reading, opens the contacts 96 which are included in a circuit connected in parallel with the circuit containing the counter coil 94 and the contacts 92.

Connected to one terminal of the movable element of the double-throw three-pole switch 78 is a coil 98 which, when energized, actuates the armature 38 of the vibration device 34. The armature 38 is thus extended, and is subsequently retracted by the spring elements 28 and 39, hereinbefore described, when the coil 98 is deenergized. Connected in series with the coil 98 is a fixed resistor 100 and a variable resistor 102. The lead from the variable resistor 102 is connected to a pole C of the three-pole double-throw switch 78. A second pole B of the three-pole double-throw switch 78 is connected through the contacts 96 to the terminal board 74, and through the terminal board to one side of the AC power source via the plug 72. The third pole A of the three-pole double-throw switch is connected to one of the contacts 96 to the terminal board which is connected through another contact to the transformer 80.

Extending between the lead which interconnects the variable resistor 102 with the pole C of the switch 78, and the lead which connects the normally closed contacts 96 with the terminal board 74 is a lead 104 which contains a pair of normally open contacts 106 and a fixed resistor 108. It should be pointed out that the subtracting counter utilized in the invention carries on the wheels or moving mechanism forming a part thereof, a stud or protuberance which is brought, by the counting down of the counter, into mechanical contact with the electrical contacts 106 at a time when the counter reaches a count of, say, three, four or five, so as to close the normally open contacts 106 for a purpose hereinafter described.

OPERATION

In the operation of the dispensing apparatus of the invention for counting out a prescribed number of pills or tablets, for example, a pharmacist initially removes from a large container, pills or tablets of a certain type which it is desired to dispense to a patient's pill vial in a predetermined quantity. A number exceeding by a substantial amount, the quantity of pills which are to be counted out in filling the prescription, are first placed in the hopper 52. The counter 14 is then set to count out the desired number of pills by moving the pointer 18 to the indicia indicating thus number. The double-throw three-pole switch 78 is then thrown from the neutral position in which it is shown in FIG. 9 to a position in which the circuit is made through the switch to the poles A, B and C.

With the switch 78 in this position, alternating current is delivered through the plug 72, the switch 78, and the terminal board 74 to the coil of the transformer 80. This energizes the detector circuit which includes the detector 60, the amplifier and frequency converter 86, the full wave rectifier 82, and the filter circuit 84. Simultaneously, through the connections on the terminal board 74, closure of the switch in the manner described makes a circuit through the terminal board 74, switch pole C, through the variable resistor 102, the fixed resistor 100, the coil 98 of the vibrating device, the switch 78, the normally closed contacts 96, and the terminal board. Thus, the vibrator device 34 is energized by the rapid, periodic energizations of the coil 98 as the rectified alternating current pulses therethrough. The fixed resistor 100 will have been selected, and the variable resistor 102 will have been selected, and the variable resistor 102 will have been set, so that the frequency with which the armature 38 of the vibrating device 34 is reciprocated is controlled to impart a desired vibrating motion to the hopper assembly 40.

As the hopper assembly 40 commences to vibrate, the pills or tablets contained in the hopper 52 pass through the "gate" or entrance to the sinuous groove 50. As the pills or tablets enter this groove, they commence to move through a curved or sinuous path in following the groove. Due to the necessity of the pills to move through this curved path, they encounter frictional resistance as they undergo the necessary turning or curving movement. The inclination of the inside walls 46 and 48 and the sinuosity of the groove 50 are selected so that the pills or tablets will move with an approximate predetermined velocity along the groove 50. As has previously been mentioned, the stroke of the armature 38 of the vibrating device 34 is relatively slow in comparison to the rate of return of the hopper assembly 40 under the influence of the fiberglass spring members 28 and 30. Thus, the motion which the hopper assembly 40 undergoes during the vibration imparted thereto a relatively slow outward movement (that is, movement in the direction of travel of the pill or tablet along the groove 50), followed by a relatively quick retractive movement. This motion which the hopper assembly 40 undergoes during the vibration imparted thereto a relatively slow outward movement (that is, movement in the direction of travel of the pill or tablet along the groove 50), followed by a relatively quick retractive movement. This motion has the effect of tending to advance the pills or tablets over a distance roughly equivalent to the length of the stroke of the armature 38, and to then quickly pull the hopper assembly backward to leave the pill substantially in its advanced position. Thus, the pills are in actuality advanced outwardly along the groove 50 in a series of very minute incremental forward movements. This type of vibratory motion is sufficiently effective in advancing the pills that it is desirable to provide a slight upward inclination in the groove 50 with respect to the horizontal. This prevents any gain in momentum by the pills as a result of gravitational influence, and acts as a desirable damper on the actual speed of advance of the pills.

As has been previously described, the groove 50 is curved over its length through a sinuous path in which the turns constantly undergo an increase in their radius of curvature. Stated differently, the groove 50 tends to become more linear in a direction progressively removed from the hopper 52 toward the open end of the spout 41. This configuration of the groove 50 results in progressively less frictional resistance being offered to the pills as they advance along the groove. Therefore, as the pills move outwardly in the groove toward the open end of the spout 41, they tend to accelerate. The result of this accelerating motion by the leading pills in the groove 50 is to increase the spacing between these pills and those which follow it from the hopper 52. Accordingly, although a number of pills may be bunched together in the first portion of the sinuous groove 50 adjacent the hopper 52, these pills tend to separate and become more widely spaced from each other as they proceed along the groove 50.

As the first pill to move down the groove 50 reaches the end of the groove, falls from the spout 41, and strikes the diaphragm forming a portion of the detector 60, a signal is transmitted through the electrical lead 62 to the amplifier and frequency converter 86. The control potentiometer for controlling the sensitivity of the detector 60, and located within the housing 68 may be adjusted as necessary to increase the sensitivity of the detector 60 where very small pills are utilized, if this should be desirable or necessary.

The signal received by the amplifier and frequency converter 86 from a the detector 60 is converted to a usable frequency, and an output signal at this frequency is delivered from the amplifier to the coil 88. When the coil 88 is energized by a signal which has ultimately originated at the detector 60, the contacts 92 are closed so that a circuit is made through the switch 78 to the counter coil 94. Energization of the counter coil 94 upon closure of the contacts 92 operates the subtractive counter to subtract one count and cause the pointer 18 of the counter 14 to move to the next lower number on the dial 16.

After the signal due to impact of one pill upon the detector 60 has been amplified, converted in frequency and passed to the coil 88, the coil then becomes deenergized until another pill strikes the diaphragm of the detector 60. Upon deenergization of the coil 88, the contacts 92 open, thus breaking the circuit to the counter coil 94 and thus deactivating the counter. When another pill emerges from the chute 41 and strikes the diaphragm of the detector 60, the counting sequence described is repeated, with the counter coil 94 again being energized to subtract another count. This procedure is repeated until a predetermined low count on the subtractive counter has been reached. This low count may be any desired number, but in most instances will be a number from three to five, inclusive.

When the counter has reached this preselected low count, a stud or protuberance appropriately located on the moving mechanism of the counter is brought into contact with the normally open contacts 106 in the electrical lead 104. This engagement of the normally open contacts 106 with the moving mechanism of the counter when a preselected low count has been reached closes these contacts to close the electrical circuit including the resistance 108. Closure of this circuit effectively divides the current which flows through the variable resistor 102, the fixed resistor 100, and the coil 98 of the vibrating device 34 with the result that the frequency of vibration of the armature 38 is substantially reduced, depending, of course, upon the magnitude of the resistance 108.

This reduction in the frequency of vibration of the armature 38 results in a corresponding slowing down of the vibratory motion imparted to the hopper assembly 40. This is a desirable feature of the present invention in that it reduces the forward momentum of the few remaining pills which are to be discharged from the spout 41 at the end of the count so that no over-count is likely to occur as a result of those pills which exceed the number desired, and which are located in the groove 50, being discharged from the end of the spout under the influence of their momentum. In other words, slowing down the vibratory device 34 and consequently the hopper assembly 40 near the end of the counting increases the accuracy with which a particular desired number of pills may be counted out without the possibility of error resulting from some excessive pills escaping from the spout 41 and striking the detector 60.

After the subtractive counter has counted out to zero, another stud or projection on the wheels or other moving mechanism of the counter functions to open the normally closed contacts 96. Opening of these contacts breaks the circuit which includes the variable resistor 102, the fixed resistor 100 and the coil 98 so that the vibrating device 34 is deenergized. Thus, no further motion is imparted to the pills in the hopper or to pills then standing in the groove 50 and the count is completed. The pharmacist can then seal the vial or pill bottle 64 which has received those pills deflected thereinto from the diaphragm of the detector 60 and present it to the patient with an accurate count of pills having been made.

It is, in some instances, desirable that, upon completion of the task of counting out a preselected number of pills, those pills remaining in the hopper 52 and in the groove 50 be rapidly returned too a jar or other storage container. For this purpose, such a container may be placed at any suitable position so as to receive pills discharged from the end of the spout 41 and the three-pole, double-throw switch 78 then thrown to the alternate position so that it contacts the poles D, E and F. When the switch is in this position, an electrical circuit is made through the fixed resistance 100 and the coil 98. The variable resistance 102, however, is no longer in the circuit in series with the fixed resistance 100. Thus, the voltage across the coil 98 is greatly increased with the result that the armature 38 vibrates much more rapidly than is the case when the variable resistance 102 is in the circuit. In this condition, the hopper assembly 40 is vibrated extremely rapidly or at high speed, with the result that all of the pills contained in the hopper assembly, whether they be in the hopper 52 or in the groove 50, are very rapidly moved down the groove 50 and into the storage jar. At the high speed of vibration which is provided, in a matter of a very few seconds, all of the pills which may have been contained in the hopper assembly 40 at the end of the countout are returned to the storage jar. The switch 78 may then be opened to the position shown in FIG. 9 to completely deenergize the apparatus.

It should be pointed out that during the counting cycle, the variable resistor 102 permits fine adjustment of the vibrating frequency of the vibrating device 34 so that the apparatus can be accommodated to wide variations in pill sizes, or to low voltage power sources, etc.

Although a preferred embodiment of the invention has been herein described, it will be apparent that various modifications and changes in the described structure and mode of operation can be effected without departure from the basic principles of the invention. For example, the switch 78 can be modified and located in such a way that the placement of the pill vial in position to receive pills will automatically commence the operation of the dispensing and counting device. Moreover, such modifications of the switch 78 can also include the location of a suitable switching device so that when the storage jar is placed in position, the high frequency vibration runout step will be automatically commenced. A delay switch can be incorporated in the circuitry which will automatically deenergize the machine at the end of, say, a ten second runout rate. The machine may also be constructed with a suitable microswitch in place of the three-pole double-throw switch 78. These variations and changes are but a few of those which can be effected in the depicted and described structure without relinquishing reliance upon the basic principles of the invention.

We claim:

1. Apparatus for dispensing a plurality of articles comprising:

means for containing the articles;

means projecting from the containing means and having a curvilinear groove therein for discharging them at a location remote from said containing means, said groove being configured to offer decreasing resistance to articles moving along the length of said groove from said containing means;

a detector device positioned at said remote location in the path of discharge of said articles from said groove for detecting each article discharged from said groove;

counter means connected to said detector device and responsive to article detection thereby; and a vibrating device connected to said containing means and to said counter means for vibrating said containing means and said means projecting therefrom until said counter means has counted a predetermined number of times in response to said detector device.

2. Apparatus as defined in claim 1 wherein said groove is sinuous in configuration.

3. Apparatus as defined in claim 2 wherein said groove is substantially curved through a serpentine configuration over a major portion of its length from said containing means outwardly, with the radius of curvature thereof continuously increasing.

4. Apparatus as defined in claim 1 wherein said groove is upwardly inclined over its length, and wherein said vibrating device vibrates said projecting means in a manner to move said articles upwardly in said groove from said containing means to said remote location.

5. Apparatus as defined in claim 1 wherein said vibrating device comprises:

means for periodically pushing said containing means in the direction which said groove extends therefrom; and means for retracting said containing means in a direction away from said groove at a substantially faster rate than said pushing means pushes said containing means and after each pushing stroke of said pushing means.

6. Apparatus as defined in claim 5 wherein said means for periodically pushing said containing means comprises a periodically energized solenoid having an armature connected to said containing means; and wherein said retracting means comprises spring means resiliently opposing the pushing stroke developed by said solenoid and resiliently biasing said containing means in said direction away from said groove upon termination of said pushing stroke.

7. Apparatus as defined in claim 1 wherein said detector device comprises an impact-type detector having a microphonic pickup for detecting articles impinging on said detector device.

8. Apparatus as defined in claim 7 and further characterized as including means for selectively varying the sensitivity of said microphonic pickup.

9. Apparatus as defined in claim 1 wherein said counter means is a subtractive sequential counter into which a preselected count number may be set, and which is responsive to signals from said detector device to count from said preselected count number to zero in correlation to the successive detection of a number of said articles corresponding to said preselected count number; and wherein said apparatus is further characterized in having electrical circuitry interconnecting said vibrating device and said subtractive sequential counter for energizing said vibrating device during the time said counter is counting from said preselected count number to zero.

10. Apparatus as defined in claim 9 wherein:
said counter further includes means for closing an electrical circuit when said counter has counted to within three through five counts of zero; and
wherein said apparatus further includes a second electrical circuit in parallel with said first-mentioned electrical circuit for dividing the current flowing through said first-mentioned electrical circuit to thereby decrease the vibrational frequency of said vibrating device, said second circuit being positioned for closure by said closing means included in said counter.

11. Apparatus as defined in claim 9 and further characterized to include means for reducing the vibrational frequency at a selected time during the counting by said counter.

12. Apparatus as defined in claim 11 and further characterized to include means for energizing and increasing the vibrational frequency of said vibrator device over the vibrational frequency thereof which occurs during the counting by said counter at a time after said counter has counted to zero.

13. Apparatus as defined in claim 12 wherein said vibrating device comprises:
means for periodically pushing said containing means in the direction which said groove extends therefrom; and
means for retracting said containing means in a direction away from said groove at a substantially faster rate than said pushing means pushes said containing means and after each pushing stroke of said pushing means.

14. Apparatus as defined in claim 13 wherein said detector comprises an impact-type detector having a microphonic pickup for detecting articles impinging on said detector device.

15. Apparatus as defined in claim 1 wherein said means for containing the articles comprises a hopper, and said projecting means comprises a chute extending from said hopper and having said groove in the bottom thereof and aligned with the bottom of sad hopper.

16. Apparatus as defined in claim 1 and further characterized to include means for selectively varying the vibrational frequency of said vibrating device.

17. Apparatus as defined in claim 16 wherein said means for selectively varying the vibrational frequency of said vibrating device comprises electrical circuitry connected to said vibration device and including:
a plurality of electrical resistances; and
switching means for electrically connecting selected amounts of electrical resistance to said vibrating device.

18. Apparatus as defined in claim 1 and further characterized to include means for selectively varying the sensitivity of said detecting device.

19. Apparatus for dispensing a plurality of articles comprising:
means for containing the articles;
means extending away from the containing means and having a groove therein for receiving articles from the containing means, and for discharging them at a location remote from the containing means;
a detector device positioned at said remote location in the path of discharge of articles from said groove for detecting each article discharged from said groove;
counter means connected to said detector device and responsive to article detection thereby;
a vibrating device connected to said containing means and to said counter means for vibrating said containing means and said means projecting therefrom until said counter means has counted a predetermined number of times in response to said detector device; and
means for automatically varying the vibrational frequency of said vibrating device when said counter means has counted a preselected number of pills.

PO-1050
(5/69)

UNITED STATES PATENT OFFICE
CERTIFICATE OF CORRECTION

Patent No. 3,558,004           Dated January 26, 1971

Inventor(s)    Harry S. Boyd, Jr. and David M. Boyd

It is certified that error appears in the above-identified patent and that said Letters Patent are hereby corrected as shown below:

Column 5, line 72, after "ment." delete the following --This motion which the hopper assembly 40 undergoes during the vibration imparted thereto a relatively slow outward movement (that is, movement in the direction of travel of the pill or tablet along the groove 50), followed by a relatively quick retactive movement.--

Column 8, line 15, after "therein for" insert --receiving articles from the containing means--

Column 10, line 2, "sad hopper" should be "said hopper".

Signed and sealed this 8th day of June 1971.

(SEAL)
Attest:

EDWARD M. FLETCHER, JR.
Attesting Officer

WILLIAM E. SCHUYLER, JR
Commissioner of Patents